(12) United States Patent
Lussier et al.

(10) Patent No.: US 7,052,471 B2
(45) Date of Patent: May 30, 2006

(54) DIGITAL THERMOMETER FOR MEASURING BODY TEMPERATURE

(75) Inventors: Sherin B. Lussier, North Providence, RI (US); Melinda F. Penney, Providence, RI (US); Dalita R. Tomellini, Rehoboth, MA (US)

(73) Assignee: Medport LLC, Providence, RI (US)

( * ) Notice: Subject to any disclaimer, the term of this patent is extended or adjusted under 35 U.S.C. 154(b) by 0 days.

(21) Appl. No.: 10/360,163

(22) Filed: Apr. 16, 2003

(65) Prior Publication Data

US 2003/0212340 A1 Nov. 13, 2003

Related U.S. Application Data

(63) Continuation-in-part of application No. 10/141,429, filed on May 8, 2002.

(51) Int. Cl.
*A61B 5/00* (2006.01)

(52) U.S. Cl. ........................ 600/549; 374/100

(58) Field of Classification Search ........ 600/300–301, 600/473, 549, 555; 374/100, 163, 170, 210
See application file for complete search history.

(56) References Cited

U.S. PATENT DOCUMENTS

| | | | | |
|---|---|---|---|---|
| 2,817,236 | A * | 12/1957 | Van Alstyne, Jr. | .......... 600/549 |
| 3,695,110 | A | 10/1972 | Biolik | |
| 3,836,900 | A * | 9/1974 | Mansfield | .................. 600/534 |
| 3,946,613 | A | 3/1976 | Silver | |
| 4,741,627 | A | 5/1988 | Fukui et al. | |
| 5,013,161 | A * | 5/1991 | Zaragoza et al. | ........... 374/208 |
| 5,018,875 | A | 5/1991 | Cook | |
| 5,165,798 | A * | 11/1992 | Watanabe | .................... 374/208 |
| 5,458,121 | A | 10/1995 | Harada | |
| 5,534,013 | A | 7/1996 | Zeindler | |
| 5,575,563 | A | 11/1996 | Chiu et al. | |
| 5,628,771 | A * | 5/1997 | Mizukawa et al. | ......... 607/102 |
| 5,991,652 | A | 11/1999 | Barthelemy et al. | |
| 6,074,090 | A * | 6/2000 | Chen | ......................... 374/183 |
| 6,090,050 | A | 7/2000 | Constantindes | |
| 6,146,015 | A * | 11/2000 | Weiss | ......................... 374/164 |
| 6,406,182 | B1 * | 6/2002 | Chen | ......................... 374/208 |
| 6,637,935 | B1 * | 10/2003 | Chen | ......................... 374/185 |
| 2004/0109491 | A1 * | 6/2004 | Chen | ......................... 374/163 |

FOREIGN PATENT DOCUMENTS

JP 61-270631 * 11/1986

* cited by examiner

*Primary Examiner*—Robert L. Nasser
*Assistant Examiner*—Patricia C. Mallari
(74) *Attorney, Agent, or Firm*—Cook, Alex, McFarron, Manzo, Cummings & Mehler, Ltd.

(57) ABSTRACT

A digital thermometer with enhanced conformity to the anatomy, such as in and around the mouth of a human being. A non-linear probe has a temperature sensor at a first end adapted to be inserted into the mouth and under the tongue, and a downwardly disposed housing portion at the second end. An intermediate portion of the probe is shaped to rest on the lower lip and/or teeth. The probe is preferably integrally molded with the housing. The probe may also be flexible such that it may be bent into the desired non-linear configuration prior to use. Such a flexible probe may have an internal stiffener with a softer plastic overmold. A display component displays the measured temperature. Electronic circuitry receives a temperature signal from the temperature sensor, translates the signal into a value representative of the measured temperature, and provides the translated value to the display for displaying the temperature.

10 Claims, 6 Drawing Sheets

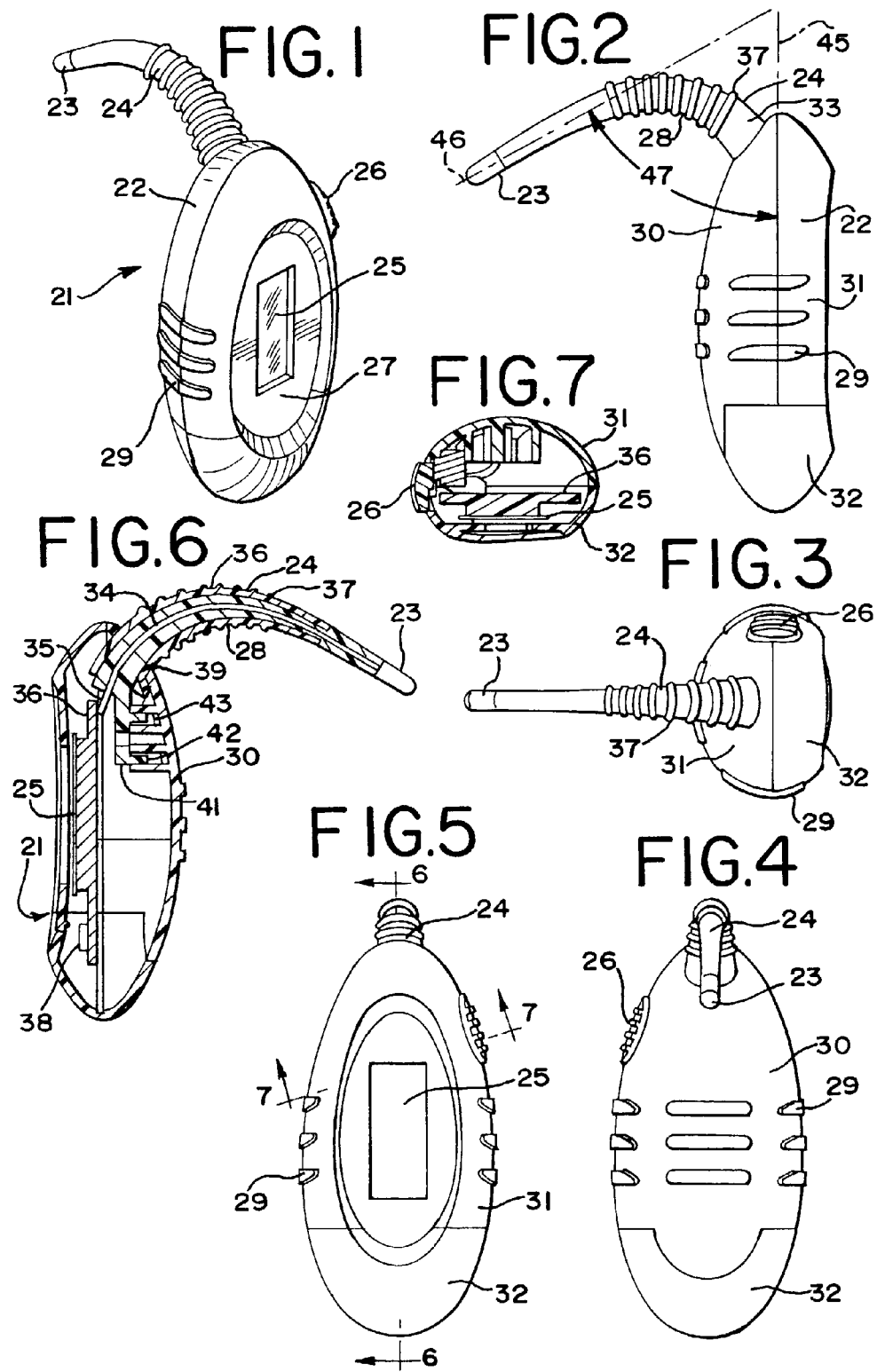

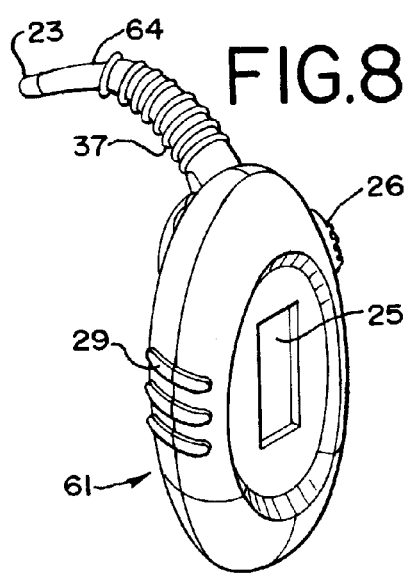
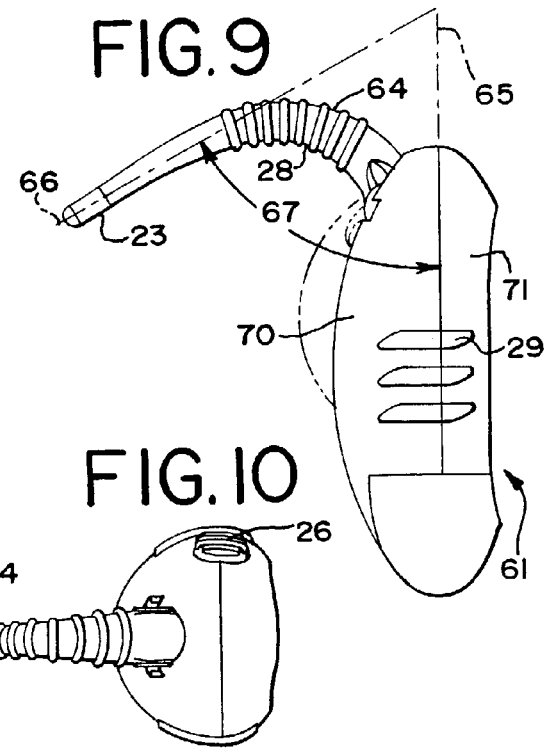
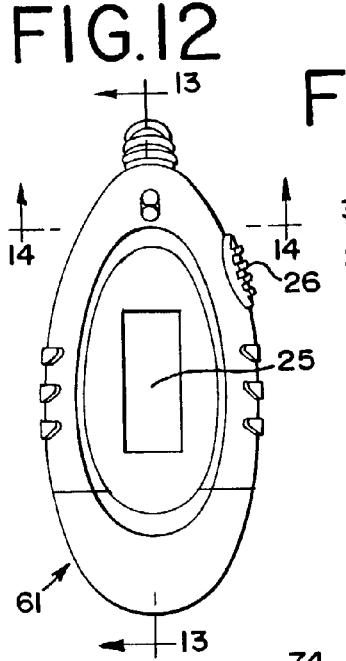
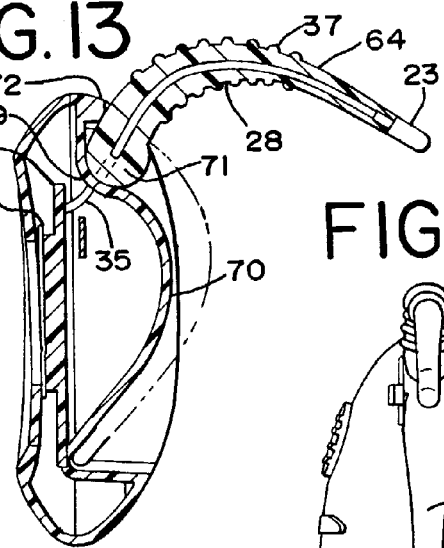
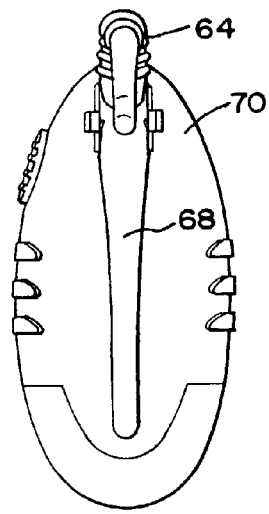

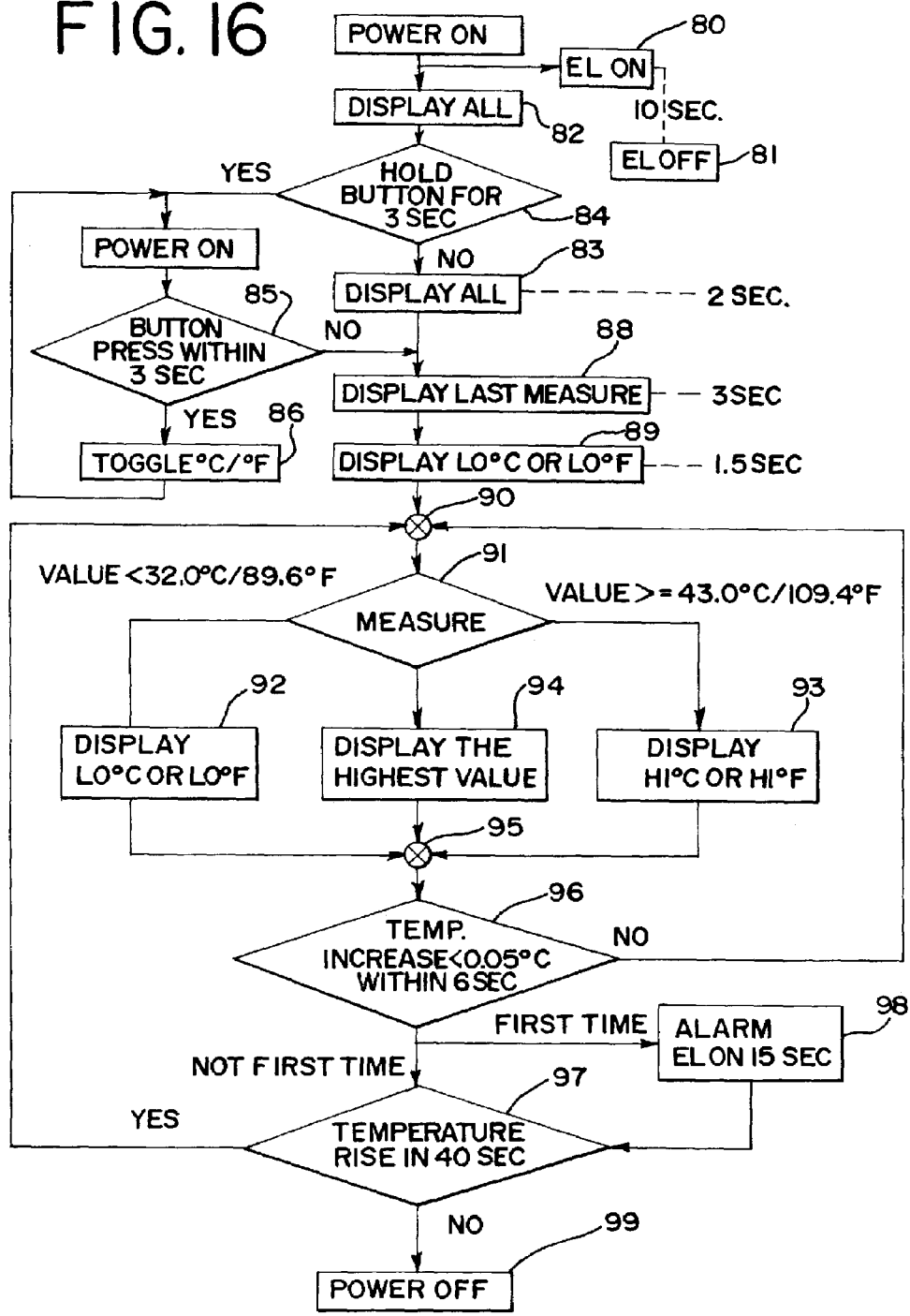

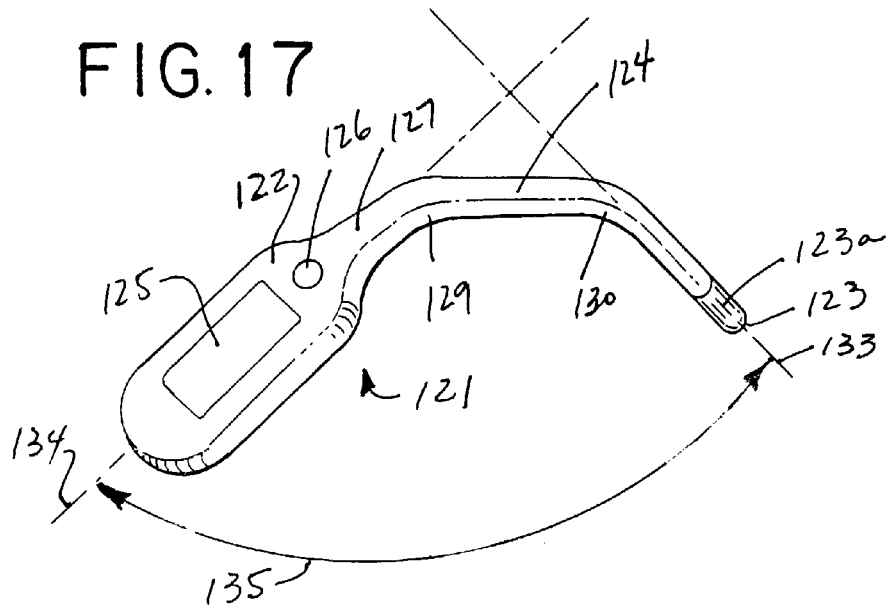
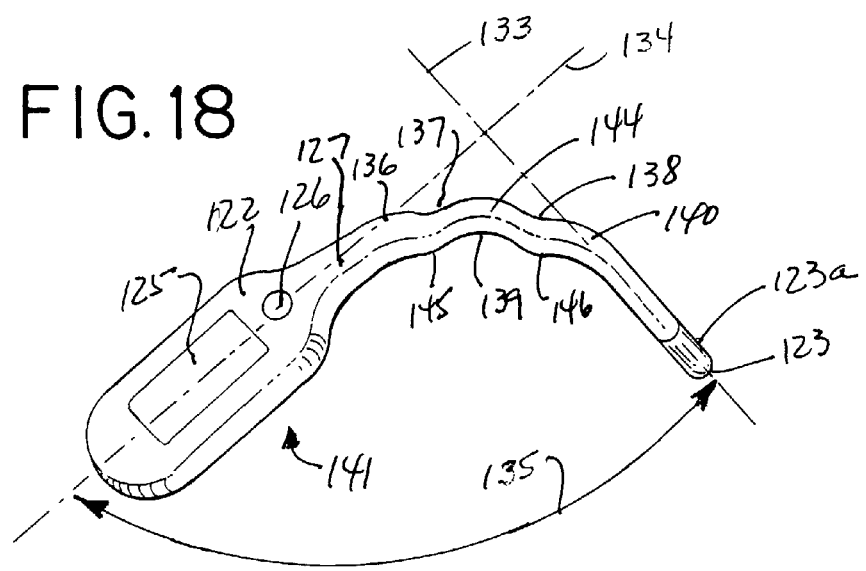

DIGITAL THERMOMETER FOR MEASURING BODY TEMPERATURE

CROSS-REFERENCE TO RELATED PATENT APPLICATION

This patent application is a continuation-in-part application of U.S. non-provisional application Ser. No. 10/141,429, filed on May 8, 2002, entitled "Digital Thermometer for Measuring Body Temperature," the priority of which is hereby claimed for all purposes.

BACKGROUND OF THE INVENTION

This invention relates generally to apparatus for electronically measuring the temperature of a living body, and more particularly, to a digital thermometer that exhibits enhanced conformity to the anatomy of a human being, especially in and around the mouth.

The basic mercury thermometer has been the standard for measuring body temperature for decades and is known virtually throughout the world. It consists of a hollow glass rod with a bulb of mercury at one end and a temperature scale along the glass rod. Typically, it is inserted into the mouth of a human being. Errors can of course be made in reading the temperature from the scale. Care and a certain amount of expertise are required for proper and accurate use.

From the patient's viewpoint, this form of thermometer is awkward because the thermometer must be held under the tongue. As viewed from the side, the rod of the thermometer should be inclined upwardly at an angle of about 30 degrees from the horizontal in order to operate effectively and accurately. Many patients have a natural tendency to bite down on the thermometer with their teeth. The upper teeth of most humans extend forward of the lower teeth with an overbite. When the thermometer is inserted in the mouth, it ordinarily rests on or close to the lower teeth. Thus, when a patient bites down on the thermometer, the lower teeth act as a fulcrum to apply rotational forces on the thermometer. Such rotational forces tend to dislodge the thermometer from under the tongue, usually up to and against the palate. This requires that the thermometer be relocated back under the tongue. To avoid this problem, some patients extend their lower jaw so that the lower teeth are forward of the upper teeth. However, this extension of the lower jaw is unnatural and uncomfortable.

Electronic thermometers have been introduced which emulate the linear structure of the basic mercury thermometer. A numerical display is usually disposed on electronic thermometers to assist in reading the measured temperature. Electronic thermometers also avoid any potential mercury exposure issues associated with a mercury thermometer. These electronic thermometers have a temperature sensing tip at one end for insertion under the tongue, an intermediate linear shaft and an enlarged body or housing at the end opposite from the sensing tip. The enlarged housing contains electronics for translating a temperature signal from the sensing tip into the currently measured temperature. Typically, the enlarged housing also contains a display, such a display of the liquid crystal display (LCD) type, for displaying the measured temperature. The enlarged housing also contains a source of electrical power, such as a miniature battery.

Such electronic thermometers with digital displays offer improved convenience and accuracy compared to reading the linear scale of the basic mercury thermometer. However, these linear electronic thermometers exacerbate the problems of keeping the tip of the thermometer under the tongue due to the increased moments of inertia presented by the additional weight and mass of the enlarged housing at the opposite end of the thermometer. This problem can be particularly acute in patients unused to, or uncooperative in, having their temperature taken, such as children or the elderly.

SUMMARY OF THE INVENTION

The present invention provides a digital thermometer with improved balance to avoid the temperature sensing tip from accidentally sliding out from under the tongue of a patient. The present invention also provides a digital thermometer that exhibits enhanced conformity to the anatomy of the patient, particularly in and around the mouth. A probe of the electronic digital thermometer is disposed between a sensing tip at one end and a housing at the opposite end. The probe is non-linear and has an intermediate portion which may be shaped to rest over the lower lip and/or lower teeth of a patient. A temperature sensing end of the probe near the temperature-sensing tip is disposed to be positioned under the tongue of a patient and in contact with the floor of the mouth. The housing is downwardly disposed outside of the mouth. Thus, the digital thermometer may support itself in some embodiments with a seating area of the probe resting on the patient's lower teeth and/or lower lip.

In accordance with other aspects of the invention, the probe may be integrally molded to the housing, or to a portion thereof. The probe may also be flexible such that it can be bent into a desired non-linear configuration to best fit the mouth of the patient. Such flexible probes may have an internal stiffener, such as a single strand of copper wire or a series of flexible joints, with a softer plastic overmold, such that the probe will hold the shape to which it is bent.

In its broadest form, the invention may be a non-linear probe adapted to be inserted into the mouth. The probe could be connected to a housing portion, or be connected by electrical conductors to a remote box with a display.

It is a general object of the present invention to provide a digital thermometer and method for measuring the temperature of a living being with better balance to keep the temperature sensing tip properly positioned for enhanced accuracy, such as under the tongue of a patient.

Another object of the present invention is to provide a digital thermometer for measuring the temperature of a human being that better conforms to the anatomy of a human, especially in and around the mouth.

Another object of the present invention in some embodiments is to provide a digital thermometer having a component capable of resting against the patient's chin whereby biting down on the thermometer probe will not cause the sensing tip to become dislodged from under the tongue. Instead, greater pressure of the component when it rests against the chin will keep the sensing tip of the digital thermometer located under the tongue.

An object of one embodiment of the present invention is to provide a flexible probe which may be bent to a selected configuration before insertion into a patient's mouth.

Yet another object of the present invention is to provide a digital thermometer with a non-linear probe that is integrally molded with the housing.

These and other objects, features and advantages of the present invention will be better understood in connection with the following drawings and description of the preferred embodiments.

BRIEF DESCRIPTION OF THE DRAWINGS

The features of the present invention that are believed to be novel are set forth with particularity in the appended claims. The invention, together with the further objects and advantages thereof, may best be understood by reference to the following description taken in conjunction with the accompanying drawings in the figures in which like reference numerals identify like elements, and in which:

FIG. 1 is perspective view of an embodiment of a digital thermometer for measuring body temperature;

FIG. 2 is a side elevational view of the digital thermometer shown in FIG. 1;

FIG. 3 is a top plan view of the digital thermometer shown in FIGS. 1 and 2;

FIG. 4 is a rear or back elevational view of the digital thermometer shown in FIGS. 1 through 3;

FIG. 5 is a front elevational view of the digital thermometer shown in FIGS. 1 through 4;

FIG. 6 is a cross-sectional view of the digital thermometer shown in FIG. 5 with the section taken in the vertical direction along section line 6—6 of FIG. 5;

FIG. 7 is a cross-sectional view of the digital thermometer shown in FIG. 5 with the section taken in an oblique direction along section line 7—7 of FIG. 5;

FIG. 8 is perspective view of an alternative embodiment illustrating a digital thermometer with a pivotal probe;

FIG. 9 is a side elevational view of the digital thermometer shown in FIG. 8;

FIG. 10 is a top plan view of the digital thermometer shown in FIGS. 8 and 9;

FIG. 11 is back or rear elevational view of the digital thermometer shown in FIGS. 8 through 10;

FIG. 12 is a front elevational view of the digital thermometer shown in FIGS. 8 through 11;

FIG. 13 is a cross-sectional view of the digital thermometer shown in FIG. 12 with the section taken in the vertical direction along section line 13—13 of FIG. 12;

FIG. 14 is a cross-sectional view of the digital thermometer shown in FIG. 12 with the section taken in the horizontal direction along section line 14—14 of FIG. 12;

FIG. 16 is flow chart illustration of the steps that an embodiment of the digital thermometer executes when in the operational mode to measure temperature;

FIG. 17 is a front perspective view of another embodiment of a digital thermometer for measuring body temperature constructed in accordance with the present invention;

FIG. 18 is a front perspective view of another embodiment of a digital thermometer for measuring body temperature with additional intermediate bends in the probe of the thermometer;

DETAILED DESCRIPTION OF THE INVENTION

Figure 15:
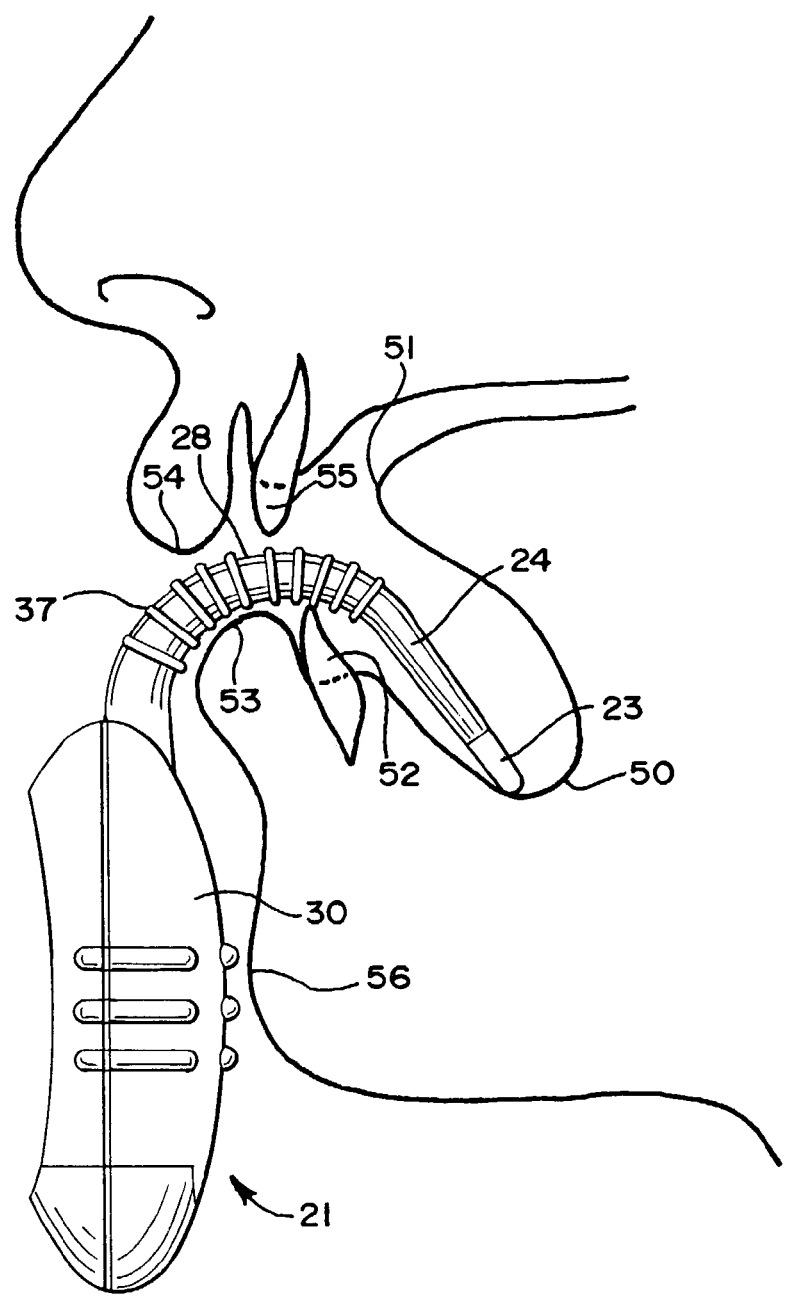
FIG. 15 is a side view illustration of the anatomy in and around a human mouth with the probe portion of the digital thermometer inserted in the mouth.

The various drawing figures will now be referred to in detail. Turning first to FIG. 1, a digital thermometer, which is especially suitable for measuring the body temperature of human being by taking a temperature measurement in the mouth, is generally designated 21. The illustrated digital thermometer 21 includes a housing 22, a temperature sensing tip 23, a probe 24 and a display 25 in the housing 22. A switch 26 is manually operable to electrically activate or deactivate the thermometer 21. For example, switch 26 may be of the pushbutton type.

As can be seen in FIG. 6, the probe 24 has a first or temperature sensing end 23 and a second end 33 that attaches to the housing 22, such as at the back housing portion 30. Temperature sensing end 23 is preferably fitted with a metal tip for better heat conduction to an internal temperature sensor, such as a thermistor. An intermediate portion 28 of probe 24 extends between the first and second ends 23 and 33. Intermediate portion 28 is non-linear. For example, intermediate portion 28 may be curved, and may form an arc. As will be discussed below with respect to FIG. 15, intermediate portion 28 is shaped to rest on and/or may generally conform to the shape of the lower lip and/or the lower teeth of mouth. Of course, the dimensions of probe 24 may be scaled as appropriate to fit a smaller mouth, such as that of a child.

The second end 33 of probe 24 may be attached at an upper location on the housing 22 as illustrated in FIGS. 1 through 6. Housing 22 is thus typically downwardly disposed from the probe 24, including its intermediate portion 28. This combination of probe 24 and housing 22 can generally be described as an inverted J configuration or a "J hook" configuration. If desired, when using this J hook configuration, part of housing 22 may rest against the patient's chin when the temperature sensing tip 23 is inserted into the mouth and under the tongue.

Suitable arrangements are provided to display the temperature measured by the thermometer. In the illustrated embodiment, a front side display 25 is provided. Temperature registration can be presented at other locations, such as at a side, edge, top or bottom location. Remote display can also be achieved with the use of suitable radio transmission technology.

As illustrated in FIGS. 1 and 5, the front side of the housing 22 may be provided with a generally flat or recessed portion 27. Recessed portion 27 has a rectangular cutout area or window for viewing the display 25. Display 25 may be of the liquid crystal display (LCD) type.

Preferably, the housing 22 has a plurality of raised ribs 29 to improve the grip of the thermometer 21. Of course, the raised ribs 29 could alternatively be recessed grooves, or the like, and achieve the same objectives. As can be seen in FIGS. 2 through 6, the ribs 29, or the like, also may be disposed on the back side of the housing 22.

With reference to FIGS. 2, 4 and 5, the illustrated housing 22 can be formed of three parts, such as a back portion 30, a front portion 31 and a bottom portion 32. All three portions 30, 31 and 32 may be formed from any suitable material, typically a polymer. For example, the housing can be formed of a thermoplastic, as by ejection molding. Rear and front housing portions 30 and 31 may snap fit together. Bottom housing portion 32 removably fits to rear and front housing portions 30 and 31 so that the interior of the housing is accessible, as for replacing an internal battery or other power source or component. It will be appreciated that various other structures for the housing portions 30, 31 or 32 are available, or may be readily designed by those of ordinary skill in the art, which would not necessitate a three-part structure for the housing 22.

Rather than having physically separate pieces, probe 24 and at least one of the housing portions, such as back housing portion 30, could be formed or molded as an integral, single component.

FIGS. 6 and 7 illustrate some of the interior details of the thermometer 21, including the probe 24. Probe 24 preferably has an interior portion 34 formed from any suitable material, typically a polymer. For example, the interior portion 34 can be formed of a relatively harder grade of plastic such as polycarbonate, an acrylonitrile butadiene styrene resin, or other polymer having the rigidity or hardness needed of a casing. Interior portion 34 accommodates suitable data transmission means to provide a temperature signal from the temperature sensing tip 23. For example, interior portion 34 can be formed about a pair of electrical conductors 35.

Electrical conductors 35 provide an electronic circuit path from a temperature sensor, such as a thermistor, in the sensing tip 23 to electronic circuitry 38 on a circuit board 36. The electronic circuitry 38 translates the temperature signal from the temperature sensor into a digital value representative of the measured temperature and provides the digital value to display 25 for displaying the measured temperature. Further information about the representative steps implemented by the electronic circuitry 38, and about the representative information displayed on display 25, can be found below with reference to discussion of the flowchart in FIG. 16.

Preferably, the probe 24 has an exterior portion 36 formed over the interior portion 34, as by over molding techniques. Exterior portion 36 consists of a polymer which is softer than the interior portion 34. Examples of these polymers include polyvinyl chloride, silicone polymers, styrene-butadiene elastomers, artificial rubber and the like. Such materials provide a more comfortable feel to the patient's mouth and may also provide enhanced friction to facilitate retention at a desired location.

Probe 24 preferably has a plurality of ribs 37 formed in the exterior portion 36, especially in that part of probe 24 that will be in contact with the patient's lips and teeth. For example, several circumferentially disposed ribs may be provided. Typical ribs may have a height in the approximate range of 0.02 to 0.10 inches or 0.51 mm to 2.54 mm. Ribs 37 assist in keeping the thermometer 21 in the position originally inserted in the mouth so that the sensing tip 23 will remain in contact with the tissues under the tongue. Grooves of similar dimensions may be recessed in probe 24, in place of ribs 37, to provide similar benefits.

With continuing reference to FIG. 6, an end 41 of probe 24, opposite from the sensing tip 23, extends through an aperture 39 in the rear housing portion 30 into the interior of the thermometer 21. End 41 may be secured to the housing portion 30 by any suitable arrangement. The illustrated embodiment uses pins 42 formed on end 41. When this style of attachment is used, pins 42 fit tightly into correspondingly shaped recesses or bosses 43 formed in the rear housing portion 30 to rigidly secure the probe 24 to the housing 22.

The probe 24 is preferably shaped to better adapt to the anatomy of that portion of the body at which temperature measurement is to be taken. The illustrated probe 24 is suitable for a human being, especially in and around the mouth. As can be seen in FIG. 2, the housing 22 defines a generally vertical axis or centerline 45, as for example along the intersection of housing portions 30 and 31. Probe 24 generally defines a centerline. This can be in the vicinity of the sensing tip 23, shown as a centerline 46. The tip 23 typically is at a downward angle when positioned in the mouth. An acute angle 47 exists between the centerlines 45 and 46. Angle 47 is in the range of about 20 degrees to about 70 degrees, and preferably between approximately 30 degrees and approximately 60 degrees. These centerline and angle relationships are typical for a probe having the shape of a single curve, such as the probes 24 and 64 shown in FIGS. 1 through 14.

Turning now to FIG. 15, it is known in the medical arts that oral measurement of body temperature is most effective if the temperature sensor is in contact with tissues at the floor 50 of the mouth under the tongue 51. It is also known that two "hot spots" exist under the tongue along the inside of the jaw to either side of the base of the underside of tongue 51. Ideally, the temperature sensing tip 23 of probe 24 is positioned at one or more of these hot spots during use.

The fit of the digital thermometer 21 to the anatomy in and around the mouth can now be better appreciated. The probe 24 rests on the lower lip 53 and/or the lower teeth 52. When provided, the circumferential ribs 37 help to maintain this positioning. That portion of probe 24 resting on lip 53 and/or teeth 52 is an intermediate portion 28 which is shaped to accommodate and/or generally conform to the shape of the lower lip 53 and/or lower teeth 52. This non-linear or curved contour of the probe 24 effectively prevents movement or shifting of the probe 24 while the temperature measurement is taking place. Because thermometer 21 or 61 does not become dislodged from under the tongue 51, either of these thermometers more quickly reaches a final measured temperature than prior art thermometers.

It can be seen that the attachment of the probe to the housing in FIG. 15 is at a more inclined angle than the embodiments illustrated in FIGS. 1 through 14. FIG. 15 thus illustrates a third embodiment of the invention.

In the illustrated embodiments, as in FIGS. 2 and 9, a curved intermediate portion 28 of probe 24 is contoured. Smooth and constant contours need not be the limit of suitable contours, which can accommodate the lower lip and lower teeth by means of other protruding offset lengths which extend more upwardly (as viewed in FIG. 6) than the rest of the probe 24 or housing 22. The illustrated curved contour is especially efficient and effective and is relatively straightforward to manufacture. The previously described ribs 37 on probe 24, when provided, impart additional friction against the lower lip and lower teeth to assist in keeping the probe in place.

The fit of probe 64 of FIGS. 8 through 13 in and around the mouth, and more particularly, on the lower lip 53 and/or lower teeth 52, is generally the same as for probe 24.

At the same time, the rear housing portion 30 of thermometer 21 is generally downwardly disposed and rests near or against the chin 56 of the patient. Thus, any biting down or pressure on probe 24 with the upper lip 54 and/or upper teeth 55 will not cause the sensing tip 23 of probe 24 to rotate out of position since any significant rotation is prevented when there is contact of rear housing portion 30 against the chin 56. Because the digital thermometer 21 better conforms to the anatomy of the mouth, thermometer 21 also feels less intrusive to a patient than the prior art linear thermometers.

Illustrated in FIGS. 8 through 14 is an alternative embodiment of the digital thermometer, generally identified by reference numeral 61. Digital thermometer 61 has an articulated probe 64 that may be rotated or pivoted to any desired position between a retracted position and a fully extended position. Referring to FIG. 11, the back housing portion 70 is provided with a recess 68 of complementary shape and size to that of probe 64. Probe 64 may be rotated into the recess 68 when not in use, as illustrated in FIG. 13. For example, positioning of probe 64 in recess 68 protects the probe 64 from damage if thermometer 61 is accidentally dropped. It also reduces thermometer 61 to a more compact size, suitable for conveniently carrying in a pocket, purse, medical bag, or the like.

Probe 64 is shown in FIG. 13 as a single material which may be any of the materials disclosed above for the interior portion 34 of probe 24. Of course, probe 64 could also be over molded with a softer grade of plastic, such as any of the materials disclosed above for the exterior portion 36 of probe 24.

With reference to FIG. 14, the rotating end 71 of probe 64 may be provided with a pair of transversely extending pins 74 and 75 to rotatably secure end 71 of probe 64 in the rear housing portion 70. Rear housing portion 70 has a stop 72 (FIG. 13) that limits the fully extended position of probe 64. As also seen in FIG. 13, the rounded end 71 of probe 64 also contacts a cam surface 69 disposed in the housing 70 to provide frictional resistance to the rotational movement of probe 64. Alternately, a frictional cam surface may be provided on the circuit board 36 to engage the rounded end 71 of probe 64. Thus, probe 64 can be manually positioned at any intermediate position between the fully opened position shown in FIG. 13 or at the closed position shown by dashed lines also in FIG. 13. Set stop locations can also be provided as desired.

Similar to the thermometer 21 shown in FIG. 2, the thermometer 61 illustrated in FIG. 9, typically defines a generally vertical axis or centerline 65. This axis can, for example, fall generally along the intersection of housing portions 70 and 71. The sensing tip 23 and the adjacent portion of the probe 64 typically define a second axis or centerline 66. An acute angle 67 exists between centerlines 65 and 66. As with thermometer 21, this angle 67 is in the range of about 20 degrees to about 70 degrees when the probe 64 is in a normal using position. Thermometer 61 with its adjustable or articulated probe 64 offers the advantage of adapting to differently sized mouths. Whether the patient has a larger mouth, such as an adult, or a smaller mouth, such as a child, probe 64 may be manually adjusted to a desired angle 47 that best fits any size mouth.

Another embodiment of a digital thermometer that is especially suited for measuring the body temperature of a human being by taking a temperature measurement in the mouth, such as at a hot spot under the tongue, is illustrated in FIG. 17. This digital thermometer, generally designated 121, includes a housing 122, a probe 124 and a display 125 disposed in the housing. Probe 124 extends as a projection of one end of housing 122 and may be integrally molded therewith. A switch 126, which may be of the pushbutton type, is manually operable to electrically activate or deactivate thermometer 121 including display 125. The backside of thermometer 121 may have an access panel or a detachable housing portion (not shown) for replacement of a miniature battery that provides electrical power for the internal electronics of the thermometer.

Probe 124 has a first temperature sensing end 123 and a second end 127 that may be integrally formed to the housing 122, or that may be secured thereto. The first or temperature sensing end 123 is preferably fitted with a metal tip 123a for better heat conduction to an internal temperature sensor, such as a thermistor. Probe 124 is non-linear and may be generally curved or arced between the first and second ends 123 and 127 such that probe 124 points downwardly with respect to housing 122. The curving or arcing of probe 124 may be continuous or non-continuous, such as with the points 129 and 130 of greater curvature located along an intermediate portion of probe 124 between ends 123 and 126. Points 129 and 130 of greater curvature may be located along probe 124 to better conform probe 124 to fit the anatomy of the mouth such that sensing tip 123a easily and comfortably reaches one of the hot spots located underneath the tongue of a patient.

It will be understood that while probe 124 is non-linear, it may have linear portions. For example, that portion intermediate the points 129 and 130 of greater curvature in FIG. 17 may be substantially linear. Those portions of probe 124 between the curve at point 130 and temperature sensing end 123, and between the curve at 129 and the housing 122, may also be substantially linear. However, due to the curves at points 129 and 130, probe 124 will still be non-linear between its first and second ends 123 and 127, respectively. That is, probe 124 may have linear portions disposed as desired and still provide a non-linear probe between the first and second ends. Probe 124 could also consist of a plurality of linear sections joined or molded at angles to generally conform to the shape of the inner portion of the mouth and to the lip and lower teeth. Of course, the dimensions of probe 124 can also be scaled as desired to fit a smaller mouth, such as that of a child.

It will also be appreciated that thermometer 121 in FIG. 17 is more compact and has a thinner profile than the thermometers 21 and 61 illustrated in FIGS. 1–15. Thermometer 121 thus has a housing 122 of smaller mass than the corresponding housings of thermometers 21 and 61. Thermometer 121 is therefore less prone to having its temperature sensing tip 123 rotate out of position from a hot spot under the tongue during use. As with thermometers 21 and 61 previously discussed, a first axis may be defined along probe 124 near the temperature sensing end 123 and another axis 134 may be defined along the housing 122. Due to the non-linear nature of probe 124, an angle 135 is defined between axes 133 and 134. Angle 125 may be either acute or obtuse, and may range from less than 180° to more than 20°.

Since housing 122 is of less mass than the corresponding housings 22 and 62 of thermometers 21 and 61, it may be desirable to have the housing 122 project from the patient's mouth at an angle, rather than resting against the patient's chin as shown in FIG. 15. For example, in the general orientation shown in FIG. 17, the display 125 in housing 122 is disposed at downward angle from the horizontal, which is also a convenient angle for medical personnel to read a measured temperature displayed on display 125. In this example, the angle 135 between axes 133 and 134 may generally be in the range of 90°±45°, but could be greater or less, if desired.

Illustrated in FIG. 18 is another embodiment of a thermometer, generally designated 141. Thermometer 141 is similar in many respects to thermometer 121 in FIG. 17, except that a probe 144 of thermometer 141 is shaped differently from probe 124 of thermometer 121. In this depicted example, probe 144 has a plurality of curves about points 136–140. The curves about points 136–140 may be said to be compound to provide a seating area of probe 144 to rest on the lower lip and/or lower teeth about point 139. Curves about points 137 and 138 form protrusions 145 and 146 on the underside of probe 144 such that the curve about point 139 provides a recessed area in the underside of probe 144 for more positive seating on the lower lip and/or teeth of the patient. Of course, protrusions 145 and 146 that form the recessed area therebetween may also be bosses that are formed into probe 144, or the like. Other alternatives in forming non-linear probe 144 to better conform to the anatomy of the mouth, and to provide convenient viewing of the displayed temperature, will be apparent to those skilled in the art, including the use of linear segments connected at angles, and the like. Similar to thermometer 121, thermometer 141 of FIG. 18 has an non-linear probe 144 such that axes 133 and 134 may be defined along certain portions of the thermometer with an angle 135 therebetween that is generally in the range of 90°±45°.

Probes 124 and 144 of thermometers 121 and 141 in FIGS. 17 and 18, respectively, are generally rigid and preformed during the manufacturing process. Probes 124 and 144 may have a rigid core with a softer overmold, such as probe 24 of thermometer 21. This is illustrated in the cross-sectional view of FIG. 6. The second ends 127 of probes 124 and 144 may also be in axial alignment with the housing 122, such as along axis 134.

Of course, thermometers 121 and 141 may be provided with a greater angle between axes 133 and 134, such as up to or somewhat less than 180°, such as that the backside of housing 122 of thermometer 121 or 141 will rest against the patient's chin when thermometer is inserted into the patient's mouth. This is in a manner similar to that shown in FIG. 15 for thermometer 21.

Figure 19:
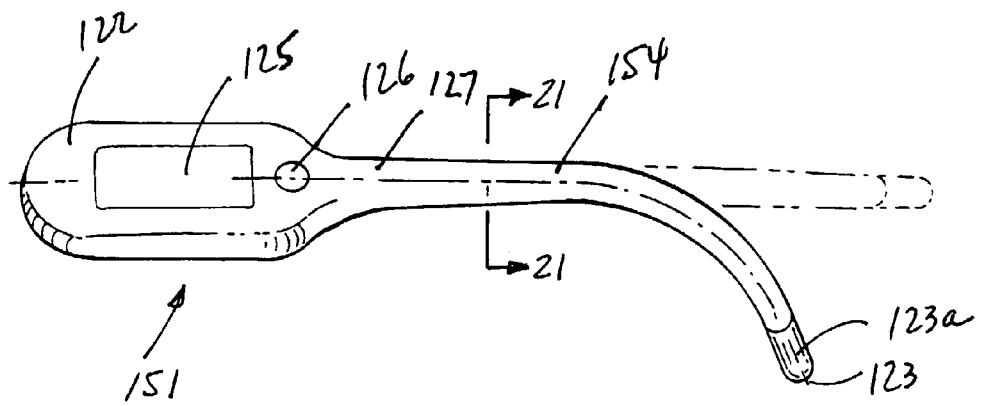
FIG. 19 is a front perspective view of a further embodiment of a digital thermometer with a probe that may be bent or curved to a desired configuration.
Figure 20:
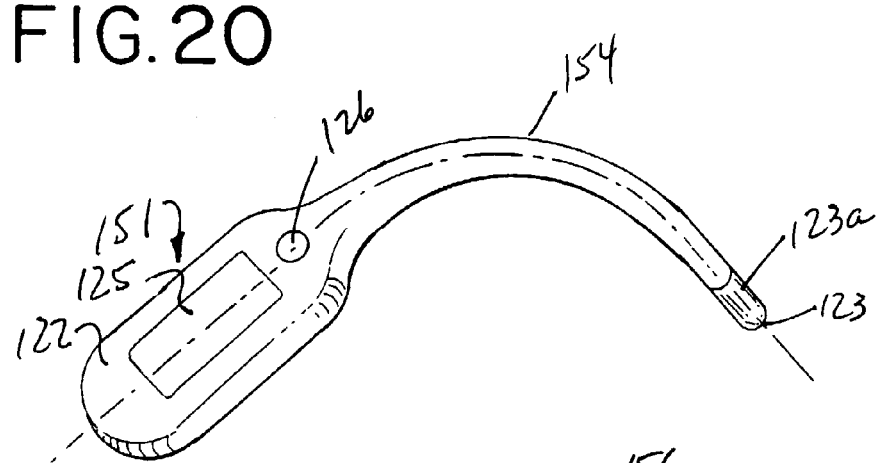
FIG. 20 is a front perspective view of the digital thermometer of FIG. 19 illustrating the probe bent into a different configuration from that illustrated in FIG. 19.
Figure 21:
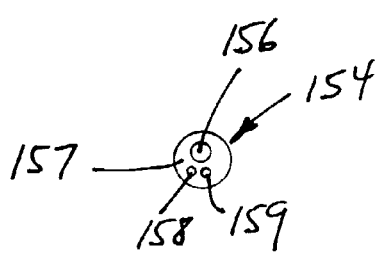
FIG. 21 is a cross-sectional view taken along section line 21—21 of FIG. 19, illustrating the internal construction of the flexible probe used with the thermometers shown in FIGS. 19 and 20.

FIGS. 19–21 illustrate another thermometer embodiment in which a thermometer, generally designated 151, has a flexible probe 154 that may be shaped or posed to the desired non-linear shape. Thermometer 151 is considered to be the preferred embodiment of the present invention. For example, thermometer 151 may be manufactured with probe 154 in a linear configuration, as illustrated by the phantom lines in FIG. 19. As with probes 124 and 144 in FIGS. 17 and 18, probe 154 may be integrally molded to housing 122. The second end 127 of probe 154 may also be in axial alignment with an axis 134 defined along housing 122.

Before use, probe 154 may be bent, shaped or configured into a desired non-linear configuration. As seen in the example of FIG. 19, probe 154 is shaped at a sharper angle closer to end 123, which may be more suited to a smaller mouth, such as that of a child. As seen in the example of FIG. 20, probe 154 may be more continuously shaped along its length, which may be more suited for a larger mouth, such as that of an adult. In this respect, probe 154 may be formed, positioned or posed as desired, including for best viewing of the temperature displayed on display 125.

Such a poseable probe 154 may be formed in any of a variety of ways. For example, as shown in FIG. 21, probe 154 may have an internal stiffener such as a malleable metal core 156 with a softer plastic overmold 157. The malleable metal core 156 may, for example, be a solid copper wire of sufficient gauge, such as #12 gauge, to retain the posed shape of the probe after being bent to the desired configuration. Such a copper wire core can also act as one of the electrical conductors between the housing 122 and the thermistor disposed in the temperature sensing end 123 to electrically connect the thermistor to the display electronics in housing 122, or two separate wires 158 and 159 may used. In yet another example, poseable probe 154 may be formed from a plurality of interconnected and stiffer pivoting joints disposed inside the softer plastic overmold 157. Such a poseable probe 154 may be bent in any desired direction, and may formed into any desired shape or configuration, including those configurations illustrated in FIGS. 17 and 18.

Similar to thermometers 21 and 61 of FIGS. 1–15, thermometers 121, 141 and 151 of FIGS. 17–20 contain electronic circuitry to receive a temperature signal from a temperature sensor located in the temperature sensing tip of the probe, to translate the temperature signal into a temperature measured by the temperature sensor and to provide the translated value of the temperature to the display for displaying the measured temperature. Further details on the operation of these thermometers are provided below in the flowchart in FIG. 16. Thermometers 121, 141 and 151 may also utilize other features of thermometers 21 and 61 that are not specifically set forth in FIGS. 17–20, such as the ribs 37 shown on probes 24 and 64 in FIGS. 1–6 and 8–13, if desired.

It may also be realized that thermometers 121, 141 and 151 of FIGS. 17–20 may be more economical to manufacture because of the unitary design of the housing 122 and the probe 124, as compared to thermometers 21 and 61 of FIGS. 1–15. Because probe 124 is effectively an extension of housing 122 in thermometers 121, 141 and 151, the thermometers of FIGS. 17–20 may have fewer parts and may require less assembly in the manufacturing processes.

For hygienic reasons, a thin and flexible plastic sheath (not shown) may be placed over probe 24 or 64 prior to insertion of probe 24 or 64 into the mouth. If used, the sheath is preferably sized to the probe. Such sheaths are inexpensive and are disposable after each use. A more substantial protective sheath may also be provided for protecting any of the probes 24, 64, 124, 144 or 154 especially their tips during packaging and between uses.

FIG. 16 is a flowchart which illustrates the steps which can be employed by any of the foregoing digital thermometers 21, 61, 121, 141 or 151 (hereinafter collectively referred to as "thermometer 21" for the purposes of FIG. 16) in measuring the temperature of a patient. When the power to thermometer 21 is first turned on by depressing the power switch 26, electro-luminescence of display 25 occurs, such as an indiglo color, for about 10 seconds as indicated by blocks 80 and 81. The thermometer may also emit one or more audible beeps. This indicates to the user that thermometer 21 is responding to switch 26 and that the internal battery, or other power source, is at a suitable operating voltage. As shown by blocks 82 and 83, when the thermometer 21 is turned on, display 25 initially activates all of the indicia on the display for about two seconds. If the power switch 26 is held down for about three seconds as shown at decision block 84, thermometer 21 waits to see if switch 26 is again depressed within about three seconds. If so, decision block 85 will cause the temperature measurement to be changed from degrees Celsius to degrees Fahrenheit, or vice versa, as indicated at block 86. Thermometer 21 then waits for another three second interval to make sure that the appropriate measurement scale has been selected.

Digital thermometer 21 then displays the last measured temperature as indicated at block 88. It is desirable to save the last measured temperature since medical personnel may not have recorded the measurement, or may have pressed switch 26 to turn the thermometer off before recording the temperature. By saving and displaying this information, thermometer 21 also reminds the user of the prior measurement.

Thermometer 21 then proceeds past node 90 to decision block 91 where the first new measurement is made. If the measured temperature at sensing tip 23 is less than 32 degrees C. or 89.6 degrees F., display 25 will indicate this condition as "LO ° C." or "LO ° F." as shown at block 92. On the other hand, if the measured temperature at sensing tip 23 is greater than 43 degrees C. or 109.4 degrees F., display 25 will indicate this condition as "HI ° C." or "HI ° F." as shown at block 93. If the initial temperature measurement is between these HI or LO conditions, the current temperature will be displayed on display 25 as shown in block 94. As also indicated in block 94, each time a new measurement is made, the highest temperature will be displayed.

Once a temperature measurement is made, the temperature measurement process passes through node 95 to decision block 96 where the latest temperature measurement is compared to the previous temperature measurement. If a minimal increase in temperature is not detected on the first measurement, an alarm is indicated as shown at block 98. For example, the alarm may be electro-luminescence of display 25 for about 15 seconds, and/or audible beeping sounds. This alarm condition may indicate that the thermometer was not properly placed in the mouth, or that some other problem has occurred.

As long as the new temperature measurement is greater than 0.05 degrees C. or 0.09 degrees F., the temperature measurement process reverts to node 90 and then to block 91 to begin taking another temperature measurement. It will generally take about 10 to 30 seconds for the thermometer to reach the final temperature. When the temperature measurements taken by thermometer 21 begin to stabilize at a final temperature, the increments between the new and last temperature measurements will be less than 0.05 degrees C. (0.09 degrees F.). At that time, the process passes to decision block 97. If there has been a temperature rise in the last 40 seconds, block 97 returns the measurement process back to node 90 to try another measurement. When the final temperature is reached, electro-luminescence of the display 25 may occur again, and/or one or more audible beeps may be emitted to alert the user that the thermometer has finished its task. If the thermometer 21 is removed from the patient's mouth, the measured temperature continues to be displayed.

If there has been no change in temperature for the last 40 seconds, block 97 causes the power to be turned off as shown in block 99, unless the user has already turned thermometer 21 off by the on/off switch 26. Thus, from the time that the last appreciable change or increment in temperature was detected, thermometer 21 holds and displays the temperature for about 40 seconds before turning itself off, thereby conserving battery power and saving battery life.

While preferred forms of the invention have been shown and described, it will be realized that alterations and modifications may be made thereto without departing from the scope of the following claims. For example, other process steps or data flow steps different from those illustrated in FIG. 16 can be practiced. Also, probe shapes other than those illustrated in the drawings can be practiced provided that the probe shapes meet the criteria of the invention to provide a non-linear structure, when an oral use is intended.

The invention claimed is:

1. A digital thermometer for measuring the temperature of a living being by inserting a portion of the thermometer in the mouth of the being comprising:
    a poseable probe with first and second ends, an intermediate portion of the probe disposed between the first and second ends,
    a temperature sensor disposed near the first end of the probe,
    an internal stiffener disposed in said poseable probe over a principal portion of the length of said probe and between the first and second ends thereof that permits shaping of the intermediate portion of the probe into a desired non-linear shape, wherein the internal stiffener substantially retains the desired non-linear shape,
    a housing portion disposed at the second end of said probe,
    a display for displaying a temperature measured by said thermometer, and
    electronic circuitry in communication with said temperature sensor to receive a temperature signal from said temperature sensor, to translate said temperature signal into a value representative of the temperature measured by the temperature sensor, and to communicate the translated value to the display for displaying the measured temperature.

2. The digital thermometer in accordance with claim 1 wherein said probe has an exterior portion formed from a softer material than said internal stiffener.

3. The digital thermometer in accordance with claim 1 wherein said internal stiffener comprises a malleable metal.

4. The digital thermometer in accordance with claim 3 wherein said malleable metal is copper.

5. The digital thermometer in accordance with claim 3 wherein said internal stiffener comprises a single strand of copper wire of approximately number 12 gauge.

6. The digital thermometer in accordance with claim 1 wherein said probe is integrally molded to said housing portion.

7. The digital thermometer in accordance with claim 1 wherein said intermediate portion of said probe is linear prior to being shaped into said non-linear shape.

8. The digital thermometer in accordance with claim 1 wherein said first end of the probe defines a first axis and said housing portion defines a second axis, said first axis and said second axis define an angle therebetween, and said intermediate portion of said probe is shaped such that said angle is in the range of from more than 20 degrees to less than 180 degrees.

9. The digital thermometer in accordance with claim 8 wherein said second end of the probe is in alignment with said second axis.

10. A digital thermometer for measuring the temperature of a living being by inserting a portion of the thermometer in the mouth of the being comprising:
    a poseable probe with first and second ends, an intermediate portion of the probe disposed between the first and second ends,
    a temperature sensor disposed near the first end of the probe,
    an internal stiffener disposed in said poseable probe between the first and second ends thereof that permits shaping of the intermediate portion of the probe into a desired non-linear shape, wherein the internal stiffener substantially retains the desired non-linear shape, said internal stiffener comprises a malleable copper metal of a single strand of copper wire of approximately number 12 gauge,
    a housing portion disposed at the second end of said probe,
    a display for displaying a temperature measured by said thermometer, and
    electronic circuitry in communication with said temperature sensor to receive a temperature signal from said temperature sensor, to translate said temperature signal into a value representative of the temperature measured by the temperature sensor, and to communicate the translated value to the display for displaying the measured temperature.

* * * * *